US008254997B2

United States Patent
Kim et al.

(10) Patent No.: US 8,254,997 B2
(45) Date of Patent: Aug. 28, 2012

(54) APPARATUS AND METHOD FOR 4-BEAMFORMING USING RADIO UNITS HAVING TWO PATHS IN WIRELESS COMMUNICATION SYSTEM

(75) Inventors: Sung-Man Kim, Suwon-si (KR); Jun-Sung Lee, Seoul (KR); Seong-Yong Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 402 days.

(21) Appl. No.: 12/657,321

(22) Filed: Jan. 19, 2010

(65) Prior Publication Data
US 2010/0184449 A1    Jul. 22, 2010

(30) Foreign Application Priority Data
Jan. 19, 2009  (KR) .................. 10-2009-0004094

(51) Int. Cl.
*H04B 1/38* (2006.01)
(52) U.S. Cl. .................. 455/561; 455/562.1; 375/260; 375/262; 375/267
(58) Field of Classification Search .......... 455/403, 455/414.1, 414.4, 20, 22, 560, 561, 562.1, 455/422.1, 550.1; 342/174, 368; 375/259, 375/260, 262, 267, 257; 370/334, 339, 436, 370/328
See application file for complete search history.

(56) References Cited

U.S. PATENT DOCUMENTS

| | | | |
|---|---|---|---|
| 6,346,910 B1 * | 2/2002 | Ito ................................. | 342/174 |
| 7,570,696 B2 * | 8/2009 | Maltsev et al. ................ | 375/260 |
| 7,693,551 B2 * | 4/2010 | Ojard ........................ | 455/562.1 |
| 7,714,781 B2 * | 5/2010 | Xia et al. ...................... | 342/370 |
| 2007/0168827 A1 * | 7/2007 | Lohr et al. .................... | 714/749 |
| 2008/0002733 A1 * | 1/2008 | Sutskover .................... | 370/436 |
| 2009/0058724 A1 * | 3/2009 | Xia et al. ..................... | 342/368 |
| 2009/0121935 A1 * | 5/2009 | Xia et al. ..................... | 342/377 |
| 2010/0034151 A1 * | 2/2010 | Alexiou et al. ............... | 370/329 |
| 2010/0144282 A1 * | 6/2010 | Laroia et al. ................. | 455/63.3 |

* cited by examiner

*Primary Examiner* — Jean Gelin

(57) ABSTRACT

A base station is capable of performing 4-beamforming using Radio Units (RU), each having two paths in a wireless communication system. The base station includes a Digital Unit (DU), a first RU, and a second RU. The DU performs a mutual conversion function between an information bit line and a digital signal, calculates beamforming coefficients for 4-beamforming, and performs the 4-beamforming using the beamforming coefficients. The first RU has two Radio Frequency (RF) paths, extracts a clock signal from a digital signal from the DU, and provides the clock signal to the second RU. The second RU has two RF paths and operates according to the clock signal provided from the first RU.

22 Claims, 6 Drawing Sheets

APPARATUS AND METHOD FOR 4-BEAMFORMING USING RADIO UNITS HAVING TWO PATHS IN WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Jan. 19, 2009 and assigned Serial No. 10-2009-0004094, the entire disclosure of which is hereby incorporated by reference.

TECHNICAL FIELD OF THE INVENTION

The present invention relates to a wireless communication system. More particularly, the present invention relates to an apparatus and a method for performing 4-beamforming using radio units (RU) each having two paths in a wireless communication system.

BACKGROUND OF THE INVENTION

In a wireless communication system, a system performance and capacity deteriorate due to phenomenon such as an interference occurring between cells or inside cells, multi-path fading, the Doppler effect, and the like. One of techniques for increasing a system capacity by addressing the above-listed performance deteriorating factors is a beamforming technique. The beamforming technique is one of smart antenna schemes, and increases a signal gain at a reception end by properly combining phases and sizes of signals transmitted, respectively, via a plurality of antennas. Generally, the beamforming technique is realized by using four or more transmission antennas. That is, to apply the beamforming technique, the transmission end needs to have four or more transmission antennas.

Presently, base stations having two transmission antennas have been developed. However, since four or more transmission antennas are required in order to apply the beamforming technique, a Radio Unit (RU) having two Radio Frequency (RF) paths of the base stations needs to be replaced by an RU having four or more RF paths. In this case, the RU having the two RF paths is not utilized and redundancy in a hardware resource occurs. Therefore, to prevent redundancy in the hardware resource, an alternative for realizing a 4-beamforming technique using an RU having two RF paths is required.

SUMMARY OF THE INVENTION

To address the above-discussed deficiencies of the prior art, it is a primary aspect of the present invention is provide an apparatus and a method for performing 4-beamforming using RUs each having two RF paths in a wireless communication system.

Another aspect of the present invention is to provide an apparatus and a method for supplying a clock signal to one RU having newly added two RF paths in a wireless communication system.

Still another aspect of the present invention is to provide an apparatus and a method for performing calibration of a base station including two RUs each having two RF paths in a wireless communication system.

Yet another aspect of the present invention is to provide an apparatus and a method for performing verification for calibration of a base station including two RUs each having two RF paths in a wireless communication system.

In accordance with an aspect of the present invention, an apparatus of a base station in a wireless communication system is provided. The apparatus includes a Digital Unit (DU) for performing a mutual conversion function between an information bit line and a digital signal, calculating beamforming coefficients for 4-beamforming, and performing the 4-beamforming using the beamforming coefficients, a first Radio Unit (RU) having two Radio Frequency (RF) paths, for extracting a clock signal from a digital signal from the DU, and providing the clock signal to a second RU, and the second RU having two RF paths, that operates according to the clock signal provided from the first RU.

In accordance with another aspect of the present invention, a method for operating a base station including two separated Radio Units (RU) each having two Radio Frequency (RF) paths in a wireless communication system is provided. The method includes calculating beamforming coefficients for 4-beamforming, performing 4-beamforming using the beamforming coefficients, and transmitting 4-beamformed RF signals via a first RU having two RF paths, and a second RU operating using a clock signal extracted by the first RU and having two RF paths.

Other aspects, advantages and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system Exemplary embodiments of the present invention provide a technique for performing 4-beamforming using RUs having two RF paths.

Figure 1:
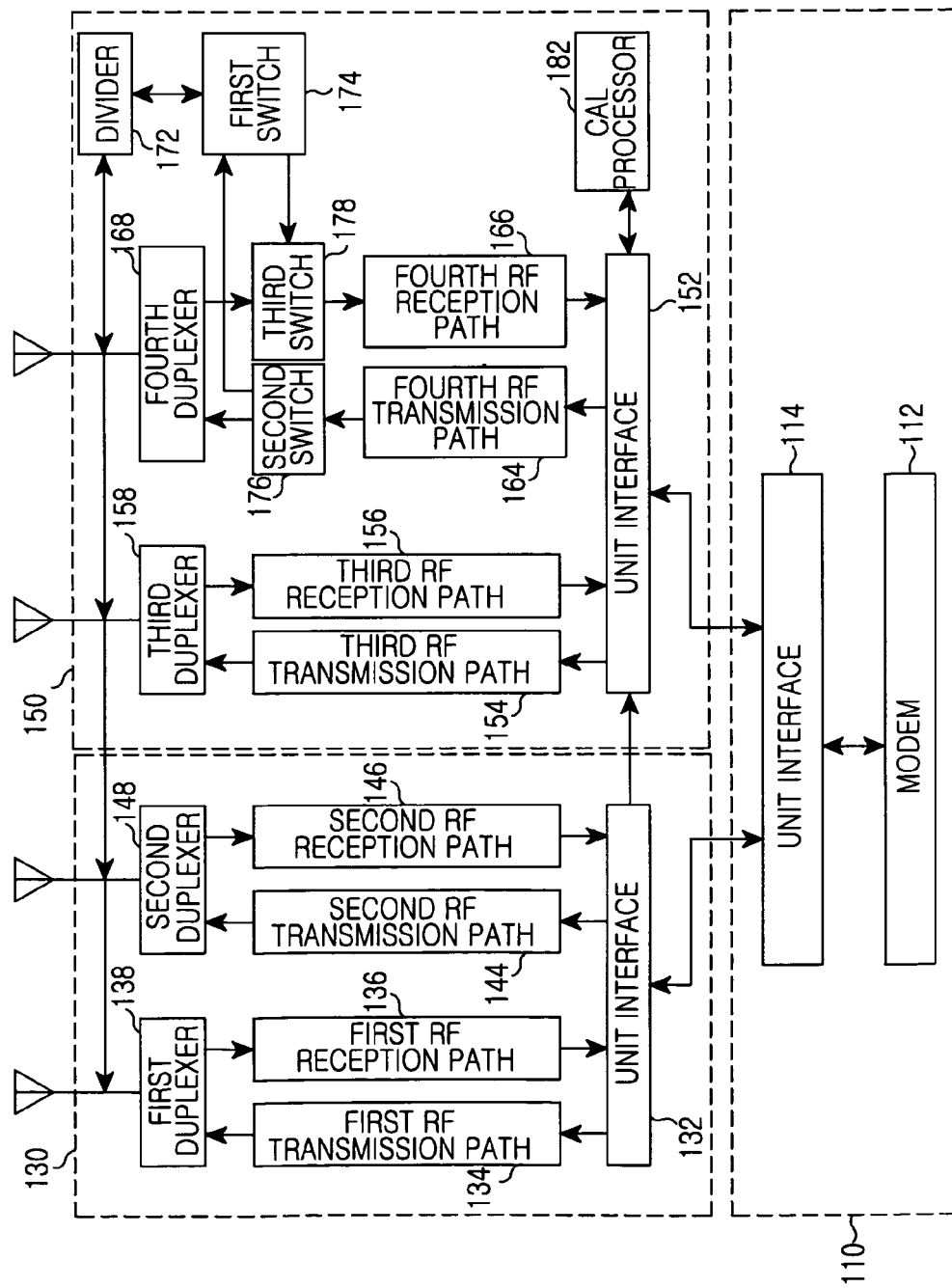
FIG. 1 illustrates a base station in a wireless communication system according to an exemplary embodiment of the present invention.

FIG. 1 illustrates a base station in a wireless communication system according to an exemplary embodiment of the present invention.

Referring to FIG. 1, the base station includes a Digital Unit (DU) 110, a first RU 130, and a second RU 150.

The DU 110 is responsible for a digital signal process, and includes a modem 112 and a unit interface 114.

The modem 112 generates baseband digital transmission signals and recovers an information bit line from baseband digital reception signals by processing transmission/reception data according to a communication standard. For example, in the case where an Orthogonal Frequency Division Multiple Access (OFDM) communication standard is used, the modem 112 performs conversion between a frequency domain signal and a time domain signal by performing Inverse Fast Fourier Transform (IFFT) and FFT. More particularly, the modem 112 performs 4-beamforming on transmission signals. That is, the modem 112 performs 4-beamforming by multiplying signals to be transmitted to respective RF paths by beamforming coefficients calculated for beamforming. Here, the beamforming coefficients are calculated with consideration of a channel status for each antenna with a reception end, a mutual interference between antennas, and the like. In addition, the modem 112 controls a calibration process for four transmission/reception paths. That is, the modem 112 determines a transmission correction coefficient and a reception correction coefficient according to a channel estimate value calculated using an uplink reference signal and a downlink reference signal, and applies the transmission correction coefficient and the reception correction coefficient to transmission signals and reception signals.

The unit interface 114 provides an interface for data exchange with the RUs 130 and 150. The unit interface 114 operates according to a Common Public Radio Interface (CPRI) standard or an Open Base Station Architecture Initiative (OBSAI) standard, and transmits/receives data using a predetermined frame structure.

The first RU 130 has two RF paths and includes a unit interface 132, a first RF transmission path 134, a first RF reception path 136, a first duplexer 138, a second RF transmission path 144, a second RF reception path 146, and a second duplexer 148. The unit interface 132 provides an interface for data exchange with the DU 110. The unit interface 132 operates according to the CPRI standard or the OBSAI standard, and transmits/receives data using a predetermined frame structure. More particularly, the unit interface 132 extracts a clock signal from a digital signal received from the DU 110, and provides the extracted clock signal to the second RU 150. Therefore, clock synchronization between the first RU 130 and the second RU 150 is performed, so that a phase deviation and jitter between a clock of the first RU 130 and a clock of the second RU 150 are removed.

The first RF transmission path 134 generates an RF transmission signal by performing up-conversion, amplification, and so forth, on a baseband signal provided from the unit interface 132. The first RF reception path 136 recovers a baseband signal by performing amplification, down-conversion, and so forth, on an RF reception signal provided from the first duplexer 138. The first duplexer 138 outputs an RF transmission signal to an antenna, and provides an RF reception signal input via the antenna to the first RF reception path 136 according to a Time Division Duplexing (TDD) scheme or a Frequency Division Duplexing (FDD) scheme.

The second RF transmission path 144 generates an RF transmission signal by performing up-conversion, amplification, and so forth, on a baseband signal provided from the unit interface 132. The second RF reception path 146 recovers a baseband signal by performing amplification, down-conversion, and so forth, on an RF reception signal provided from the second duplexer 148. The second duplexer 148 outputs an RF transmission signal to an antenna, and provides an RF reception signal input via the antenna to the second RF reception path 146 according to the TDD scheme or the FDD scheme.

The second RU 150 has two RF paths, and includes a unit interface 152, a third RF transmission path 154, a third RF reception path 156, a third duplexer 158, a fourth RF transmission path 164, a fourth RF reception path 166, a fourth duplexer 168, a divider 172, a first switch 174, a second switch 176, a third switch 178, and a CALibration (CAL) processor 182.

The unit interface 152 provides an interface for data exchange with the DU 110. The unit interface 152 operates according to the CPRI standard or the OBSAI standard, and transmits/receives data using a predetermined frame structure. More particularly, the unit interface 152 receives a clock from the unit interface 132 of the first RU 130. Therefore, clock synchronization between the first RU 130 and the second RU 150 is performed, so that a phase deviation and jitter between a clock of the first RU 130 and a clock of the second RU 150 are removed.

The third RF transmission path 154 generates an RF transmission signal by performing up-conversion, amplification, and so forth, on a baseband signal provided from the unit interface 152. The third RF reception path 156 recovers a baseband signal by performing amplification, down-conversion, and so forth, on an RF reception signal provided from the third duplexer 158. The third duplexer 158 outputs an RF transmission signal to an antenna, and provides an RF reception signal input via the antenna to the third RF reception path 156 according to the TDD scheme or an FDD scheme.

The fourth RF transmission path 164 generates an RF transmission signal by performing up-conversion, amplification, and so forth, on a baseband signal provided from the unit interface 152. The fourth RF reception path 166 recovers a baseband signal by performing amplification, down-conversion, and so forth, on an RF reception signal provided from the fourth duplexer 168. The fourth duplexer 168 outputs an RF transmission signal to an antenna, and provides an RF reception signal input via the antenna to the fourth RF reception path 166 according to the TDD scheme or the FDD scheme.

The divider 172 is designed for calibration, and transfers signals coupled at the four antennas to the fourth RF reception path 166 via the first switch 174 and the third switch 178, or transfers a reference signal provided from the fourth RF transmission path 164 via the second switch 176 and the first switch 174 to the four antennas.

The CAL processor 182 is designed for calibration, calculates a downlink channel estimate value using a downlink reference signal, and provides the downlink channel estimate value to the modem 112 via the unit interface 152. In addition, the CAL processor 182 generates an uplink reference signal for calculating an uplink channel estimate value, and provides the uplink reference signal to the divider 172 via the fourth RF transmission path 164, the second switch 176, and the first switch 174.

A calibration process is described below in detail based on the construction illustrated in FIG. 1. The calibration is a process required for applying a beamforming technique. The purpose of the calibration is to correct phase differences and bandwidth differences between four RF paths. In exemplary embodiments of the present invention, the calibration is separately performed for an uplink and a downlink.

Figure 2:
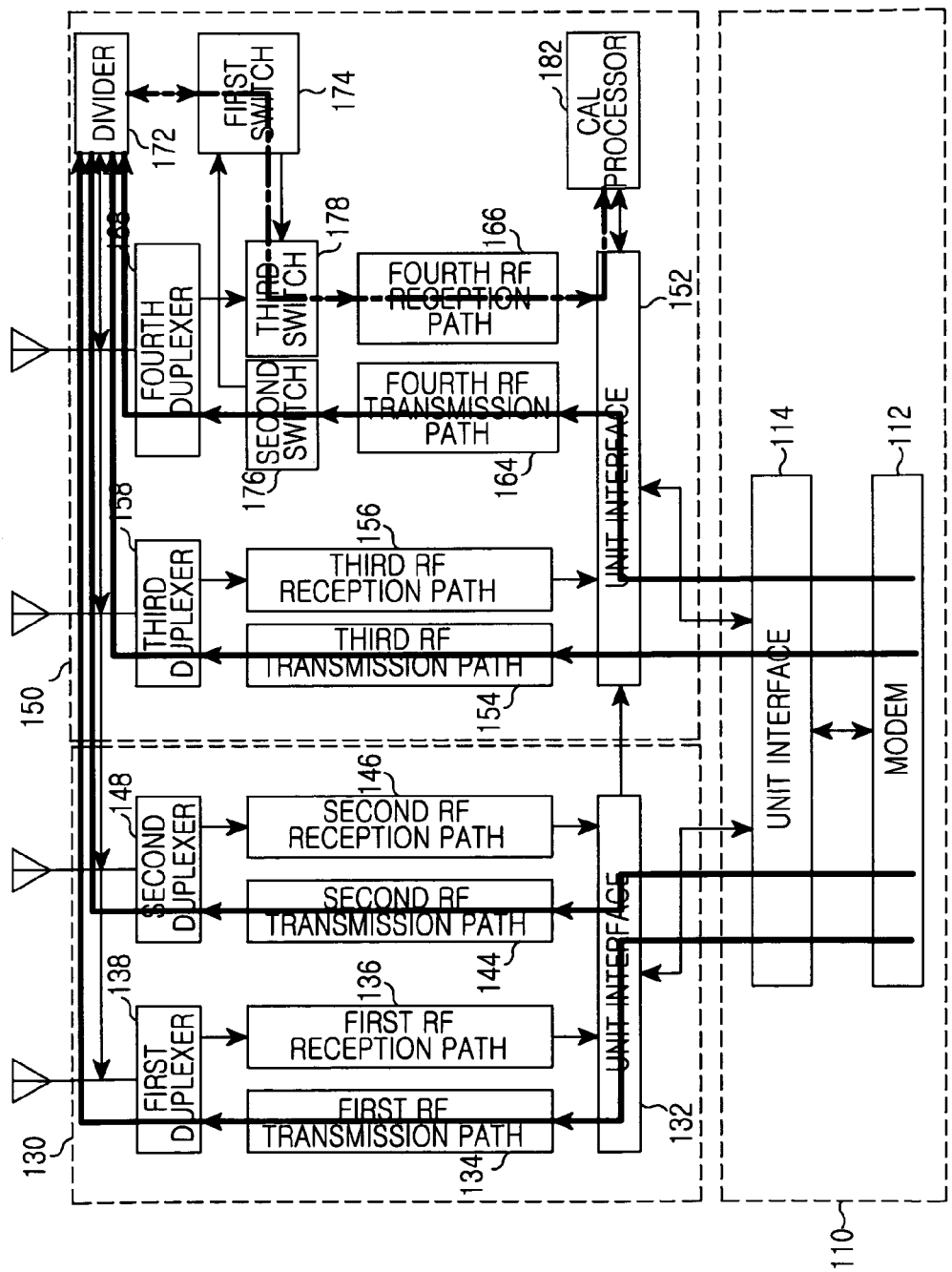
FIG. 2 illustrates a flow of a reference signal for downlink calibration in a wireless communication system according to an exemplary embodiment of the present invention.

Downlink reference signals for downlink calibration move along paths illustrated in FIG. 2. Referring to FIG. 2, the modem 112 generates downlink reference signals, and sequentially provides the downlink reference signals to the four RF transmission paths 134, 144, 154, and 164 included in the two RUs 130 and 150 via the unit interface 114. The downlink reference signals provided to the RF transmission paths 134, 144, 154, and 164 pass through the RF transmission paths 134, 144, 154, and 164 and reach the antennas, and are coupled at the antennas and provided to the divider 172.

The divider 172 provides the downlink reference signals that have been sequentially received after having passed through the RF transmission paths 134, 144, 154, and 164, to the fourth RF reception path 166 via the first switch 174 and the third switch 178. The CAL processor 182 receives the downlink reference signals via the fourth RF reception path 166 and the unit interface 152. In addition, the CAL processor 182 calculates downlink channel estimate values using the downlink reference signals, and provides the downlink channel estimate values to the modem 112 via the unit interface 152. At this point, the downlink channel estimate values include four values corresponding to the RF transmission paths 134, 144, 154, and 164, respectively.

The modem 112 calculates signal distortion rates at respective RF transmission paths 134, 144, 154, and 164 using the downlink channel estimate values, and determines inverse distortion rates for the signal distortion rates, that is, transmission correction coefficients. After that, when performing communication, the modem 112 applies the transmission correction coefficients to downlink signals.

Figure 3:
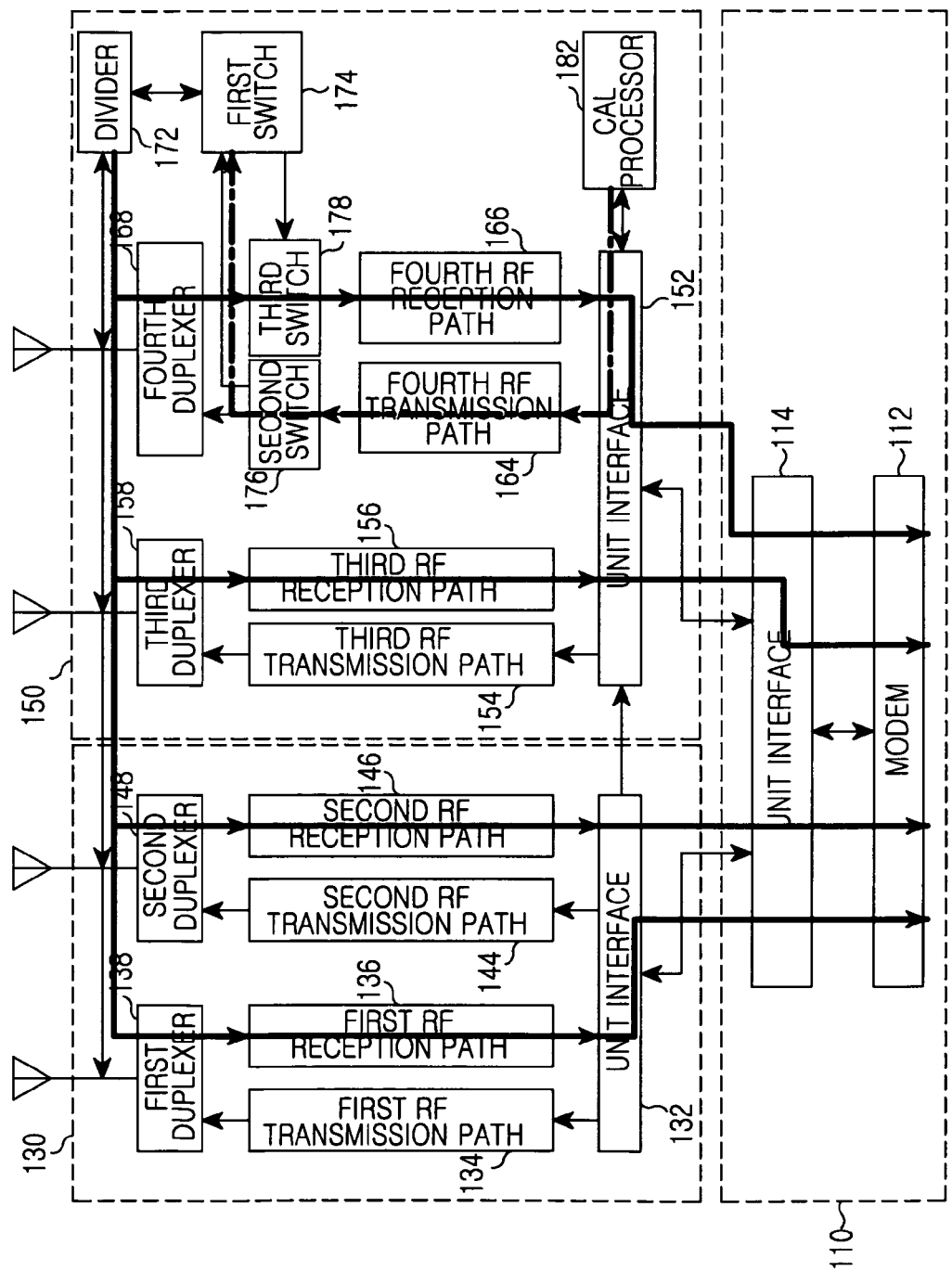
FIG. 3 illustrates a flow of a reference signal for uplink calibration in a wireless communication system according to an exemplary embodiment of the present invention.

Uplink reference signals for uplink calibration move along paths illustrated in FIG. 3. Referring to FIG. 3, the CAL processor 182 generates an uplink reference signal, and provides the uplink reference signal to the divider 172 via the fourth RF transmission path 164, the second switch 176, and the first switch 174. The divider 172 divides the uplink reference signal to the same four uplink reference signals, which are input to the four antennas. Therefore, the uplink reference signals pass through the RF reception paths 136, 146, 156, and 166, and reach the modem 112.

The modem 112 calculates uplink channel estimate values using uplink reference signals that have been received after having passing through the RF reception paths 136, 146, 156, and 166. In addition, the modem 112 calculates signal distortion rates at respective RF reception paths 136, 146, 156, and 166 using the uplink channel estimate values, and determines inverse distortion rates for the signal distortion rates, that is, reception correction coefficients. After that, when performing communication, the modem 112 applies the reception correction coefficients to uplink signals.

Figure 4:
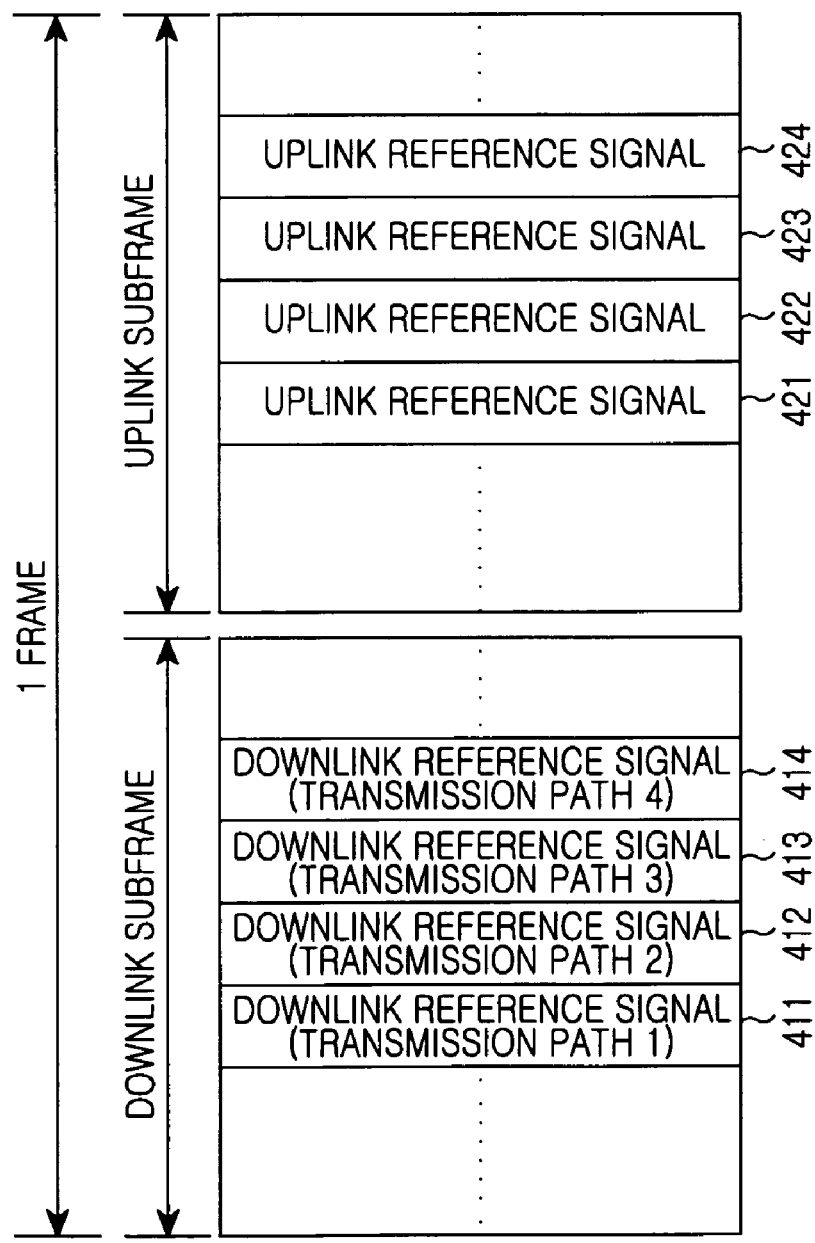
FIG. 4 illustrates a construction of a reference signal for calibration in a wireless communication system according to an exemplary embodiment of the present invention.

As described with reference to FIGS. 2 and 3, reference signals are used for calibration. For example, the reference signal is configured as illustrated in FIG. 4. FIG. 4 illustrates one frame section. That is, one frame is used for the calibration procedure, and data communication is suspended while the calibration procedure is performed. As illustrated in FIG. 4, downlink reference signals occupy four symbols 411 to 414 in a downlink subframe. That is, since a downlink reference signal is used on one signal basis per transmission path, a total of four downlink reference signals are sequentially transmitted. In the case of an uplink reference signal, even when only one reference signal is used, the reference signal may be provided to all reception paths. However, to increase reliability of uplink calibration, uplink reference signals may be repeatedly transmitted via a plurality of symbols 421 to 424 inside an uplink subframe as illustrated in FIG. 4. In addition, the downlink reference signals may be repeatedly transmitted within a range of the number of available symbols. The frequency of repetition of transmission of the uplink reference signal and transmission of the downlink reference signal may change depending on the intention of an operator of an exemplary embodiment of the present invention.

When correction coefficients are determined as described above, the modem 112 corrects transmission signals and reception signals according to the correction coefficients. At this point, when it is determined that the correction coefficients are not suitable values, accurate beamforming cannot be performed. Therefore, a verification procedure for the correction coefficients is performed according to an exemplary embodiment of the present invention.

Figure 5:
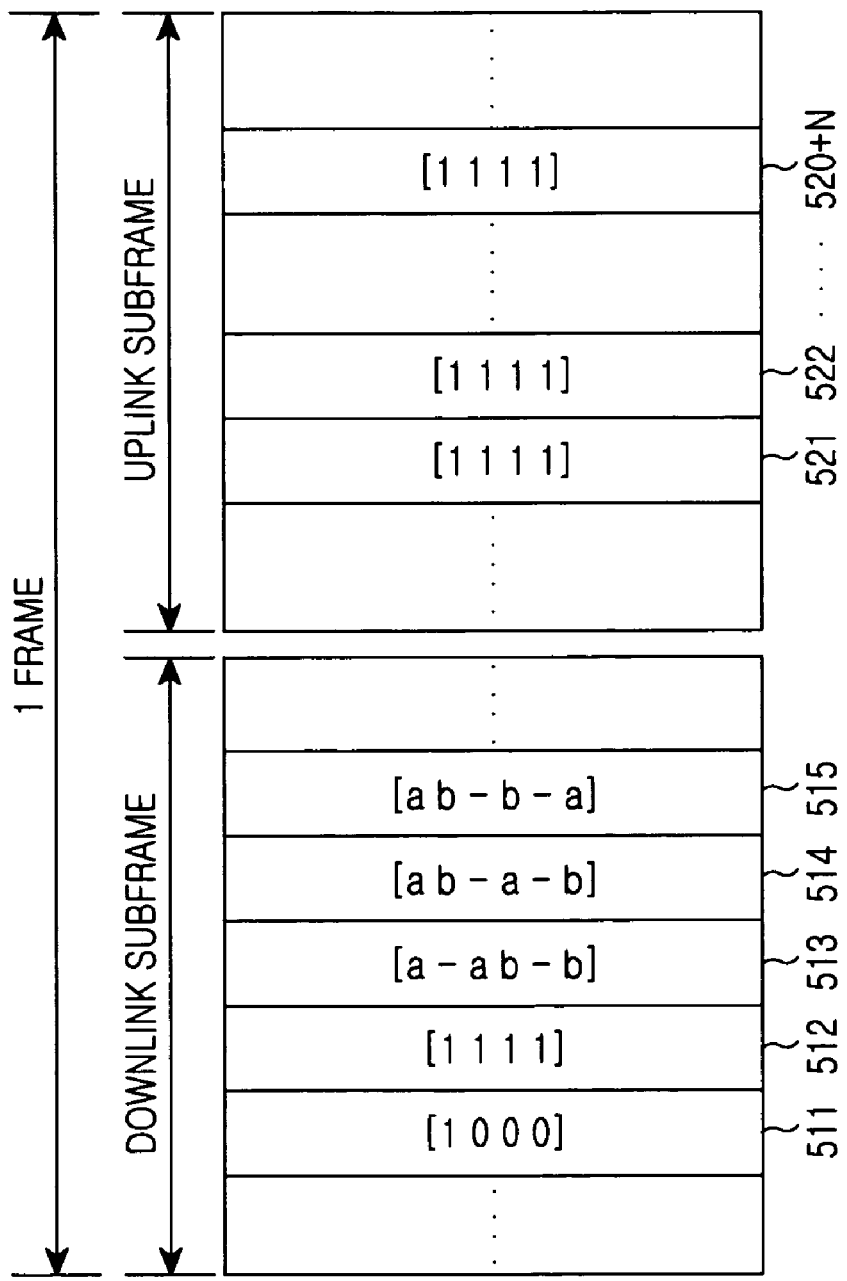
FIG. 5 illustrates a construction of a verification signal for a calibration verification procedure in a wireless communication system according to an exemplary embodiment of the present invention.

A verification signal is used for the verification procedure. For example, the verification signal is configured as illustrated in FIG. 5. Referring to FIG. 5, five symbols 511 to 515 are used for downlink verification, and N symbols 521 to 520+N are used for uplink verification. Downlink verification signals are [1 0 0 0], [1 1 1 1], [a −a b −b], [a b −a −b], and uplink verification signals are all [1 1 1 1].

The verification signals are multiplied by correction coefficients determined via the above-described calibration procedure, and then transmitted via the same path as the transmission path of reference signals. That is, downlink verification signals are transmitted by the modem 112, pass through the paths illustrated in FIG. 2, and then are input to the modem 112. Uplink verification signals are transmitted by the CAL processor 182, pass through the paths illustrated in FIG. 3, and then are input to the modem 112.

In the case of downlink verification procedure, verification signals are multiplied by correction coefficients, pass through the transmission paths 134, 144, 154, and 164, and then are received in the modem 112. In addition, the modem 112 reviews accuracy of the correction coefficients using the received signals. A specific verification procedure for each verification signal is described below.

Downlink verification signals [1 0 0 0] are described. The modem 112 normalizes downlink verification signals by multiplying the downlink verification signals by transmission correction coefficients, transmits a signal corresponding to 1 via the first RF transmission path 134, and transmits 0 via the second RF transmission path 144, the third RF transmission path 154, and the fourth RF transmission path 164. Therefore, the modem 112 measures power of a signal received via the divider 172.

Downlink verification signals [1 1 1 1] are described. The modem 112 normalizes downlink verification signals by multiplying the downlink verification signals by transmission correction coefficients, and simultaneously transmits signals corresponding to 1 via the transmission paths 134, 144, 154, and 164. Signals that pass through the four transmission paths 134, 144, 154, and 164 constructively interfere with one another while passing through the divider 172. Therefore, if the correction coefficients are accurate, a power value of a signal received via the divider 172 becomes four times greater than a power value measured when [1 0 0 0] is transmitted. That is, the modem 112 measures power of a signal received via the divider 172, and determines whether the measured power value is four times greater than the power value measured when [1 0 0 0] is transmitted. However, since the four times greater value is a theoretical value of an ideal case, the modem 112 determines whether a difference between the four time greater value than the power value measured when [1 0 0 0] is transmitted, and the power of a signal received via the divider 172 is less than a relevant threshold.

Downlink verification signals [a −a b −b], [a b −a −b], [a b −b −a] are described. The modem 112 normalizes downlink verification signals by multiplying the downlink verification signals by transmission correction coefficients, and transmits the verification signals multiplied by the correction coefficients to the transmission paths 134, 144, 154, and 164. Signals that pass through the four transmission paths 134, 144, 154, and 164 interfere with one another while passing through the divider 172. At this point, a and −a destructively interfere with each other, and b and −b destructively interfere with each other. Therefore, if the correction coefficients are accurate, a power value of a signal received via the divider 172 becomes 0. That is, the modem 112 measures power of a signal received via the divider 172, and determines whether the measured power value is 0. However, since 0 is a theoretical value of an ideal case, the modem 112 determines whether the measured power value is less than a threshold.

In the case of an uplink verification procedure, uplink verification signals [1 1 1 1] pass through the RF reception paths 136, 146, 156, and 166, and then are received in the modem 112. In addition, the modem 112 divides the received signals by reception correction coefficients, and then reviews accuracy of the correction coefficients using results of division. A specific verification procedure for each verification signal is described below.

The modem 112 that has received first verification signals controls signals received via the RF reception paths 136, 146, 156, and 166 to the same size and the same phase by dividing the received signals by reception correction coefficients. At this point, if the reception correction coefficients are accurate, sum of power values of the signals received via the RF reception paths 136, 146, 156, and 166 is four times greater than a power value of a signal corresponding to one RF reception path. Therefore, the modem 112 sums power values of signals arithmetically, and determines whether a summed result is four times greater than a power value of a signal corresponding to one RF reception path. However, since the four times greater value is a theoretical value of an ideal case, the modem 112 determines whether a difference between the summed result and the four times greater value than the power value of the signal corresponding to the reception path is less than a relevant threshold.

The modem 112 that has received second verification signals controls signals received via the RF reception paths 136, 146, 156, and 166 to the same size and the same phase by dividing the received signals by reception correction coefficients. Subsequently, the modem 112 determines whether a destructive interference occurs by multiplying the controlled signals by [a −a b −b] and then summing them. At this point, if the reception correction coefficients are accurate, a perfect destructive interference occurs, and a summed result becomes 0. However, since 0 is a theoretical value of an ideal case, the modem 112 determines whether the measured power value is less than a threshold.

The modem 112 that has received third verification signals controls signals received via the RF reception paths 136, 146, 156, and 166 to the same size and the same phase by dividing the received signals by reception correction coefficients. Subsequently, the modem 112 determines whether a destructive interference occurs by multiplying the controlled signals by [a b −a −b] and then summing them. At this point, if the reception correction coefficients are accurate, a perfect destructive interference occurs, and a summed result becomes 0. However, since 0 is a theoretical value of an ideal case, the modem 112 determines whether the measured power value is less than a threshold.

The modem 112 that has received fourth verification signals controls signals received via the RF reception paths 136, 146, 156, and 166 to the same size and the same phase by dividing the received signals by reception correction coefficients. Subsequently, the modem 112 determines whether a destructive interference occurs by multiplying the controlled signals by [a b −b a] and then summing them. At this point, if the reception correction coefficients are accurate, a perfect destructive interference occurs, and a summed result becomes 0. However, since 0 is a theoretical value of an ideal case, the modem 112 determines whether the measured power value is less than a threshold.

The above-described calibration procedure and verification procedure are performed during an operation of a base station. One frame is used for the calibration, and one frame is used for the verification procedure. That is, communication is suspended while the calibration and the verification procedure are performed.

The calibration procedure is performed at a period of predetermined several minutes or predetermined tens of minutes, and may be re-performed depending on the calibration result. Here, the calibration result denotes a combination of a verification procedure result and an amount of change in a channel estimate value before and after the calibration procedure, and is derived as one of 'success', 'suddenly-change-success', and 'failure'. 'Success' denotes that an amount of change in the channel estimate value is less than a threshold and simultaneously, the verification procedure is successful, 'suddenly-change-success' denotes that an amount of change in the channel estimate value is greater than the threshold and simultaneously, the verification procedure is successful, and 'failure' denotes that the verification procedure fails regardless of an amount of change in the channel estimate value. Here, an amount of change in the channel estimate value is expressed in terms of an inner product of channel estimate values before and after the calibration procedure and a difference value of 1. An operation of a base station depending on the calibration result is illustrated in Table 1.

TABLE 1

| First Calibration Result | Second Calibration Result | Third Calibration Result | Beamforming Function |
|---|---|---|---|
| success | — | — | Active |
| suddenly-change-success | success | — | Active |
| suddenly-change-success | suddenly-change-success | — | Inactive |
| suddenly-change-success | failure | — | Inactive |
| failure | success or suddenly-change-success | success | Active |
| failure | success or suddenly-change-success | suddenly-change-success | Inactive |
| failure | success or suddenly-change-success | failure | Inactive |
| failure | failure | — | Inactive |

That is, when a performance period of a calibration procedure arrives, the modem 112 performs the calibration procedure, calculates an amount of change in the channel estimate value, and then performs the verification procedure. In addition, the modem 112 determines a calibration result depending on an amount of change in the channel estimate value and whether the verification procedure is successful, determines whether to re-perform the calibration procedure and whether to activate a beamforming function according to Table 1, and operates according to the determination. Activation and inactivation of the beamforming function are valid during one calibration performance period, and may change depending on a calibration result of the next period.

Figure 6:
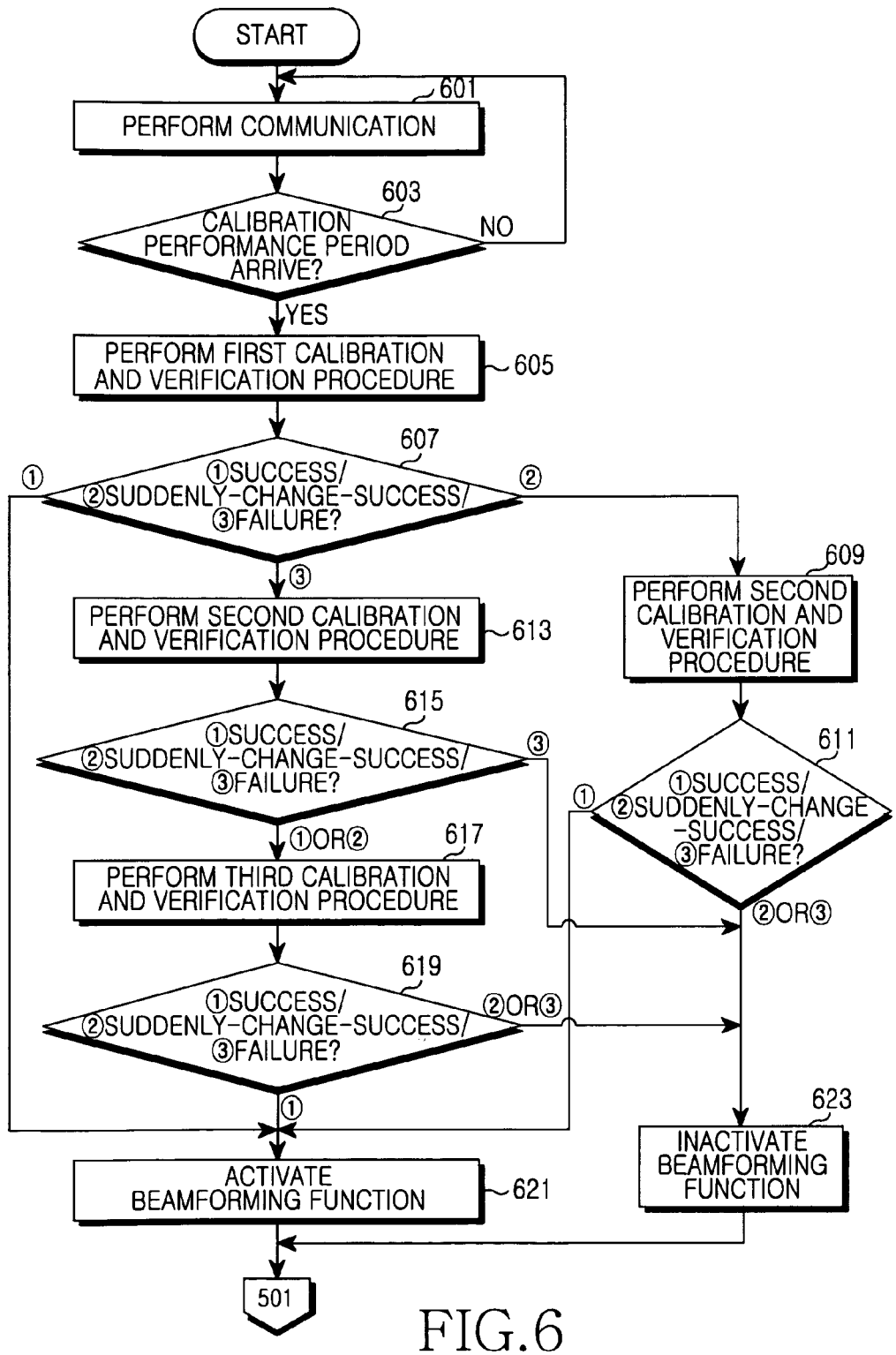
FIG. 6 illustrates a procedure for operating a base station in a wireless communication system according to an exemplary embodiment of the present invention.

FIG. 6 is a view illustrating a procedure for operating a base station in a wireless communication system according to an exemplary embodiment of the present invention.

Referring to FIG. 6, the base station performs communication in step 601. At this point, the base station performs 4-beamforming using two RUs each having two RF paths. That is, the base station calculates beamforming coefficients for the 4-beamforming, and performs the 4-beamforming using the beamforming coefficients. At this point, one of the two RUs provides a clock signal to the other RU. However, when a beamforming function is inactivated according to a previous calibration result, the base station does not perform the beamforming.

While performing the beamforming, the base station determines whether a performance period of a calibration procedure arrives in step 603. That is, the calibration procedure is performed at a period of several minutes or tens of minutes.

When the performance period of the calibration procedure arrives, the base station performs a first calibration procedure and a verification procedure in step 605. That is, the base station suspends communication, and then transmits downlink reference signals via the paths illustrated in FIG. 2, and determines transmission correction coefficients using the downlink reference signals that have passed through the paths. In addition, the base station transmits uplink reference signals via the paths illustrated in FIG. 3, and determines reception correction coefficients using the uplink reference signals that have passed through the paths. Subsequently, the base station calculates an amount of change in the channel estimate value before and after the calibration procedure, and performs the verification procedure. At this point, the base station performs the verification procedure using verification signals illustrated in FIG. 5.

After performing the first calibration procedure and the verification procedure, the base station determines a first calibration result in step 607. Here, the first calibration result denotes a combination of a result of the verification procedure and an amount of change in the channel estimate value before and after the calibration procedure, and is derived as one of 'success', 'suddenly-change-success', and 'failure'. At this point, when the first calibration result is 'success', the base station goes to step 621.

When the calibration result is 'suddenly-change-success', the base station performs a second calibration procedure and a verification procedure in step 609. That is, the base station repeats the same process as step 605. In other words, the base station determines correction coefficients by performing the calibration procedure using reference signals, calculates an amount of change in the channel estimate value, and performs the verification procedure using verification signals.

After performing the second calibration procedure and the verification procedure, the base station determines a second calibration result in step 611. Here, the second calibration result denotes a combination of a result of the verification procedure and an amount of change in the channel estimate value before and after the calibration procedure, and is derived as one of 'success', 'suddenly-change-success', and 'failure'. When the second calibration result is 'success', the base station goes to step 621, and when the second calibration result is 'suddenly-change-success' or 'failure', the base station goes to step 623.

When the first calibration result is 'failure' in step 607, the base station performs the second calibration procedure and the verification procedure in step 613. That is, the base station repeats the same process as step 605. In other words, the base station determines correction coefficients by performing the calibration procedure using reference signals, calculates an amount of change in the channel estimate value, and performs the verification procedure using verification signals.

After performing the second calibration procedure and the verification procedure, the base station determines a second calibration result in step 615. Here, the second calibration result denotes a combination of a result of the verification procedure and an amount of change in the channel estimate value before and after the calibration procedure, and is derived as one of 'success', 'suddenly-change-success', and 'failure'. When the second calibration result is 'failure', the base station goes to step 623.

When the second calibration result is 'success' or 'suddenly-change-success', the base station performs a third calibration procedure and a verification procedure in step 617. That is, the base station repeats the same process as step 605. In other words, the base station determines correction coefficients by performing the calibration procedure using reference signals, calculates an amount of change in the channel estimate value, and performs the verification procedure using verification signals.

After performing the third calibration procedure and the verification procedure, the base station determines a third calibration result in step 619. Here, the third calibration result denotes a combination of a result of the verification procedure and an amount of change in the channel estimate value before and after the calibration procedure, and is derived as one of 'success', 'suddenly-change-success', and 'failure'.

When the third calibration result is 'success', the base station activates a beamforming function in step 621. Accordingly, the base station utilizes the beamforming function until a performance period of the next calibration arrives, and performs communication. In contrast, when the third calibration result is 'suddenly-change-success' or 'failure', the base station inactivates the beamforming function in step 623. Accordingly, the base station performs communication without the beamforming function until a performance period of the next calibration arrives.

According to the above-described exemplary embodiment of the present invention, when a calibration performance period arrives, the base station performs a calibration procedure, and then performs a verification procedure. However, according to other exemplary embodiments of the present invention, the base station may perform the verification process before the calibration process is performed. That is, when a calibration performance period arrives, the base station performs the verification process, and then performs the calibration process only when the verification process fails. For example, in the operation procedure illustrated in FIG. 6, when the calibration performance period arrives, the base station performs a verification process. When the verification process fails, the base station performs steps 605 to 623. When the verification process is successful, the base station returns to step 601.

In a wireless communication system, one RU having two RF paths is added to a base station having an RU having two RF paths, so that a 4-beamforming system is easily realized. Furthermore, reliability of beamforming may be improved through a calibration procedure and a verification procedure of a base station including RUs each having two RF paths.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An apparatus of a base station in a wireless communication system, the apparatus comprising:
 a Digital Unit (DU) configured to perform a mutual conversion function between an information bit line and a digital signal, calculate beamforming coefficients for 4-beamforming, and perform the 4-beamforming using the beamforming coefficients;
 a first Radio Unit (RU) comprising two Radio Frequency (RF) paths and configured to extract a clock signal from a digital signal from the DU, and provide the clock signal to a second RU; and
 the second RU comprising two RF paths and configured to operate according to the clock signal provided from the first RU.

2. The apparatus of claim 1, wherein the DU comprises a modem configured to control a calibration procedure, determine transmission correction coefficients and reception correction coefficients according to the calibration procedure, and perform a verification procedure for determining whether calibration is successful.

3. The apparatus of claim 2, wherein the modem generates downlink reference signals for downlink calibration,
 the second RU comprises a divider configured to receive the downlink reference signals that pass through four RF transmission paths and reach antennas and a processor configured to calculate downlink channel estimate values using the downlink reference signals provided from the divider, and
 the modem is configured to determine the transmission correction coefficients using the downlink channel estimate values.

4. The apparatus of claim 3, wherein the modem is configured to multiply verification signals for verifying the transmission correction coefficients by the transmission correction coefficients, and determine whether the downlink calibration is successful by comparing power values for respective transmission paths of the verification signals multiplied by the transmission correction coefficients.

5. The apparatus of claim 2, wherein the second RU comprises a processor configured to generate uplink reference signals for uplink calibration, and a divider configured to provide the uplink reference signals to antennas, and
 the modem is configured to calculate uplink channel estimate values using the uplink reference signals that have passed through four RF reception paths, and determine reception correction coefficients using the uplink channel estimate values.

6. The apparatus of claim 5, wherein the processor generates verification signals configured to verify the reception correction coefficients, and
 the modem is configured to divide the verification signals that have passed through the four RF reception paths by the reception correction coefficients, and then determine whether the uplink calibration is successful by comparing power values for respective transmission paths of the verification signals.

7. The apparatus of claim 2, wherein the modem is configured to calculate an amount of change in a channel estimate value before and after the calibration procedure, and determine whether to re-perform the calibration procedure depending on a calibration result derived as a combination of the amount of change in the channel estimate value and a verification procedure result, and
 the calibration result comprises one of 'success' denting that the amount of change in the channel estimate value is less than a threshold, and simultaneously, the verification procedure is successful, 'suddenly-change-success' denoting that the amount of change in the channel estimate value is greater than a threshold, and simultaneously, the verification procedure is successful, and 'failure' denoting that the verification procedure fails regardless of the amount of change in the channel estimate value.

8. The apparatus of claim 7, wherein the modem is configured to activate a beamforming function when a first calibration result is 'success', and performs a second calibration procedure when the first calibration result is 'suddenly-change-success' or 'failure'.

9. The apparatus of claim 8, wherein when performing the second calibration procedure because the first calibration result is 'suddenly-change-success', the modem is configured to activate the beamforming function when a second calibration result is 'success', and inactivate the beamforming function when the second calibration result is 'suddenly-change-success' or 'failure'.

10. The apparatus of claim 8, wherein when performing the second calibration procedure because the first calibration result is 'failure', the modem is configured to inactivate the beamforming function when a second calibration result is 'failure', and perform a third calibration procedure when the second calibration result is 'success' or 'suddenly-change-success'.

11. The apparatus of claim 10, wherein the modem is configured to activate the beamforming function when a third calibration result is 'success', and inactivate the beamforming function when the third calibration result is 'suddenly-change-success' or 'failure'.

12. A method for operating a base station comprising two separated Radio Units (RU) each having two Radio Frequency (RF) paths in a wireless communication system, the method comprising:
    calculating beamforming coefficients for 4-beamforming;
    performing 4-beamforming using the beamforming coefficients; and
    transmitting 4-beamformed RF signals via a first RU having two RF paths, and a second RU operating using a clock signal extracted by the first RU and having two RF paths.

13. The method of claim 12, further comprising:
    determining transmission correction coefficients and reception correction coefficients using a calibration procedure; and
    performing a verification procedure for determining whether calibration is successful.

14. The method of claim 13, wherein the determining of the transmission correction coefficients comprises:
    generating downlink reference signals for downlink calibration;
    calculating downlink channel estimate values using the downlink reference signals that have passed through four RF transmission paths and reached antennas, respectively; and
    determining the transmission correction coefficients using the downlink channel estimate values.

15. The method of claim 14, wherein the performing of the verification procedure comprises:
    multiplying verification signals for verifying the transmission correction coefficients by the transmission correction coefficients; and
    determining whether the downlink calibration is successful by comparing power values for respective transmission paths of the verification signals multiplied by the transmission correction coefficients.

16. The method of claim 13, wherein the determining of the reception correction coefficients comprises:
    generating uplink reference signals for uplink calibration;
    calculating uplink channel estimate values using the uplink reference signals that have passed through four RF reception paths; and
    determining reception correction coefficients using the uplink channel estimate values.

17. The method of claim 16, wherein the performing of the verification procedure comprises:
    generating verification signals for verifying the reception correction coefficients;
    dividing the verification signals that have passed through the four RF reception paths by the reception correction coefficients; and
    determining whether the uplink calibration is successful by comparing power values for respective transmission paths of the verification signals.

18. The method of claim 13, further comprising:
    calculating an amount of change in a channel estimate value before and after the calibration procedure; and
    determining whether to re-perform the calibration procedure depending on a calibration result derived as a combination of the amount of change in the channel estimate value and a verification procedure result, and
    the calibration result comprises one of 'success' denting that the amount of change in the channel estimate value is less than a threshold, and simultaneously, the verification procedure is successful, 'suddenly-change-success' denoting that the amount of change in the channel estimate value is greater than a threshold, and simultaneously, the verification procedure is successful, and 'failure' denoting that the verification procedure fails regardless of the amount of change in the channel estimate value.

19. The method of claim 18, wherein the determining of whether to re-perform the calibration procedure comprises:
    activating a beamforming function when a first calibration result is 'success'; and
    performing a second calibration procedure when the first calibration result is 'suddenly-change-success' or 'failure'.

20. The method of claim 19, further comprising:
    when performing the second calibration procedure because the first calibration result is 'suddenly-change-success', activating the beamforming function when a second calibration result is 'success'; and
    inactivating the beamforming function when the second calibration result is 'suddenly-change-success' or 'failure'.

21. The method of claim 19, further comprising:
    when performing the second calibration procedure because the first calibration result is 'failure',
    inactivating the beamforming function when a second calibration result is 'failure'; and
    performing a third calibration procedure when the second calibration result is 'success' or 'suddenly-change-success'.

22. The method of claim 21, further comprising:
    activating the beamforming function when a third calibration result is 'success'; and
    inactivating the beamforming function when the third calibration result is 'suddenly-change-success' or 'failure'.

* * * * *